United States Patent
Herndon

(10) Patent No.: US 9,976,704 B2
(45) Date of Patent: May 22, 2018

(54) DEVICE FOR ACTUATING PRESSURE RELIEF VALVE

(71) Applicant: HALLIBURTON ENERGY SERVICES, INC., Houston, TX (US)

(72) Inventor: Lawrence A. Herndon, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days. days.

(21) Appl. No.: 15/503,468

(22) PCT Filed: Aug. 27, 2014

(86) PCT No.: PCT/US2014/052939
§ 371 (c)(1),
(2) Date: Feb. 13, 2017

(87) PCT Pub. No.: WO2016/032458
PCT Pub. Date: Mar. 3, 2016

(65) Prior Publication Data
US 2017/0241595 A1    Aug. 24, 2017

(51) Int. Cl.
*F17D 5/00*    (2006.01)
*E21B 43/26*   (2006.01)
(Continued)

(52) U.S. Cl.
CPC .............. *F17D 5/00* (2013.01); *F16K 17/06* (2013.01); *F16K 17/406* (2013.01); *E21B 33/14* (2013.01);
(Continued)

(58) Field of Classification Search
CPC .......... Y10T 137/1632; Y10T 137/1782; Y10T 137/1789; F16K 17/406; E21B 33/14; E21B 43/20; E21B 43/26; E21B 43/267
See application file for complete search history.

(56) References Cited

U.S. PATENT DOCUMENTS 4,787,409 A    11/1988  Taylor
4,850,392 A    7/1989   Crump et al.
(Continued)

FOREIGN PATENT DOCUMENTS

CA    1285455 C    7/1991

OTHER PUBLICATIONS

Rupture Pin Technology, Get the Power of the Pin, "Model I-CU Frac Fluid Relief Valve", pp. 1-4.
(Continued)

*Primary Examiner* — Caroline N Butcher
(74) *Attorney, Agent, or Firm* — Polsinelli PC

(57) ABSTRACT

A pressure relief valve including a housing having an inlet and a relief outlet connected by a fluid flow passageway, the inlet fluidly connectable to a work string. The pressure relief valve includes a head sealingly disposed within the passageway between the inlet and relief outlet closing the fluid flow passageway between the inlet and relief outlet. An elongate buckling rod supports the head and is bucklable at a predetermined load thereby permitting sliding of the head from between the inlet and a relief outlet and opening the fluid flow passageway. A projection within the housing is extendible to an extended configuration, wherein in the extended configuration the projection applies a lateral force perpendicular to the longitudinal direction of the buckling rod bending the rod from its axial center thereby decreasing the load at which the buckling rod collapses.

18 Claims, 7 Drawing Sheets

(51) Int. Cl.
 *F16K 17/40* (2006.01)
 *F16K 17/06* (2006.01)
 *E21B 33/14* (2006.01)
 *E21B 43/20* (2006.01)
 *E21B 43/267* (2006.01)

(52) U.S. Cl.
 CPC .............. *E21B 43/20* (2013.01); *E21B 43/26* (2013.01); *E21B 43/267* (2013.01)

(56) References Cited

U.S. PATENT DOCUMENTS

| | | | |
|---|---|---|---|
| 5,348,039 A | | 9/1994 | Taylor et al. |
| 5,577,524 A | | 11/1996 | Taylor |
| 5,685,329 A | | 11/1997 | Taylor |
| 5,727,586 A | | 3/1998 | Taylor |
| 7,438,087 B1 | | 10/2008 | Taylor |
| 2009/0000406 A1 | * | 1/2009 | Brazier ............... F16K 17/1626 73/865.8 |
| 2010/0154894 A1 | | 6/2010 | Kotapish et al. |
| 2013/0126152 A1 | | 5/2013 | Banks et al. |
| 2014/0048255 A1 | * | 2/2014 | Baca .................... E21B 33/068 166/250.1 |
| 2014/0166267 A1 | * | 6/2014 | Weightman ............. E21B 47/06 166/250.01 |

OTHER PUBLICATIONS

International Search Report and Written Opinion; PCT Application No. PCT/US2014/052939; dated May 19, 2015.

\* cited by examiner

DEVICE FOR ACTUATING PRESSURE RELIEF VALVE

CROSS-REFERENCE TO RELATED APPLICATIONS

This application is a national stage entry of PCT/US2014/052939 filed Aug. 27, 2014, said application is expressly incorporated herein in its entirety.

FIELD

The present disclosure relates generally to pumping systems involved in oil and gas exploration and production operations, and in particular to pressure control safety features.

BACKGROUND

Oil and gas operations involve drilling deep within subterranean formations to access hydrocarbon reserves. There are many phases during such operations including drilling, casing the wellbore, fracturing, removal of hydrocarbons, water flooding, as well as numerous other activities during the life and course of the wellbore. Involved in these phases is the need to pump various fluids down into the wellbore for a variety of reasons, depending on the phase and required needs of the project.

The pumping of these various fluids requires surface equipment including pumps, pipes, valves and other components used to complete the piping system, as well as downhole components. During pumping operations, inevitably high pressures are often reached within the system. Such high pressures can create life threatening safety hazards. For example if any of the pumping components fail as pressure exceeds safe levels, the contents under pressure or the failed components could cause harm to workers within the vicinity or result in damaged equipment.

In an effort to avoid such excessive pressure conditions, pressure relief valves have been employed, which upon reaching a particular pressure threshold provide a relief outlet for the fluid so as to prevent potentially dangerous pressure conditions.

BRIEF DESCRIPTION OF THE DRAWINGS

Implementations of the present technology will now be described, by way of example only, with reference to the attached figures, wherein.

Figure 1:
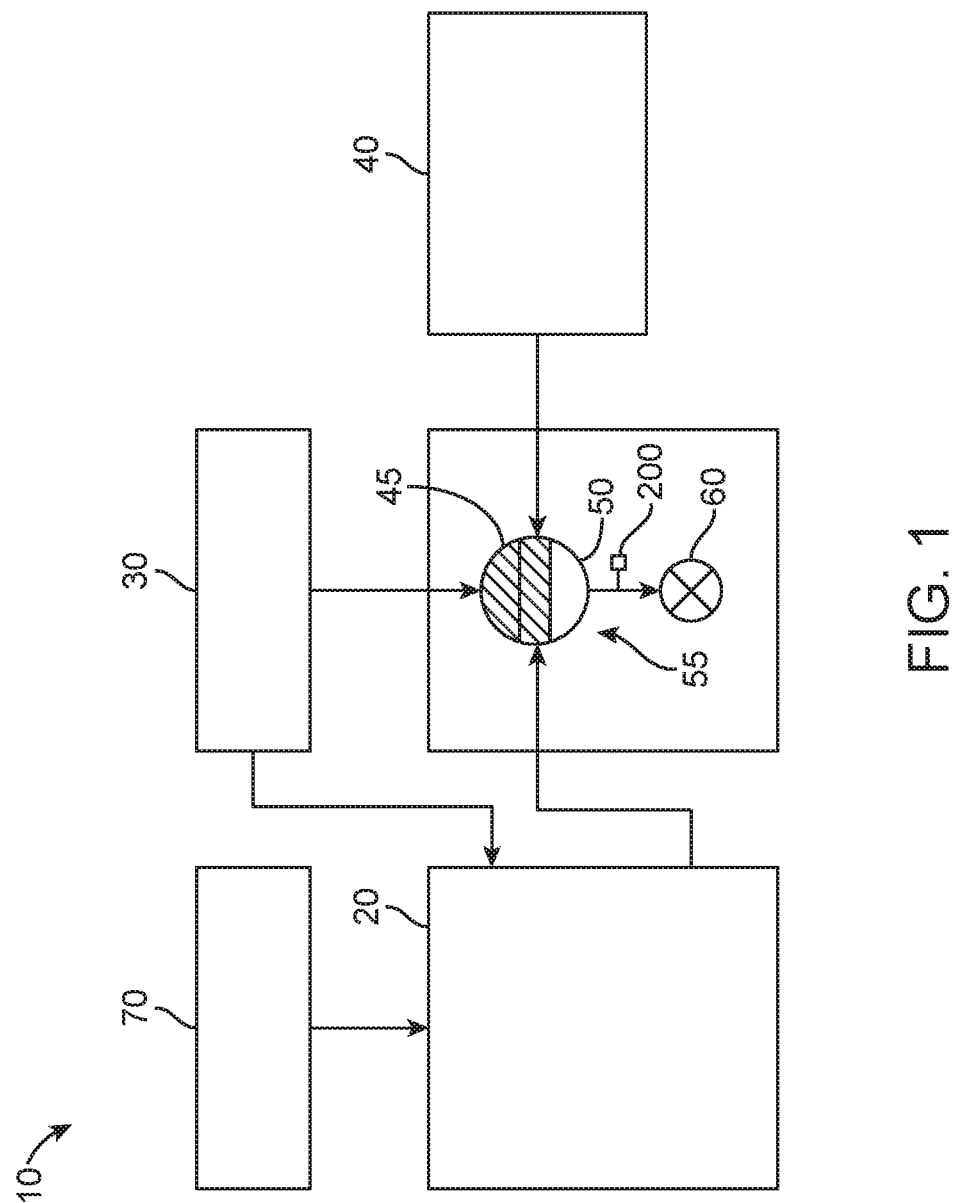
FIG. 1 is a diagram illustrating an example of a fracturing system that employs a pressure relief valve in accordance with the present disclosure.

It should be understood that the various embodiments are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, when used in relation to orientation within a wellbore, shall mean in relation to the bottom or furthest extent of, the surrounding wellbore even though the wellbore or portions of it may be deviated or horizontal. Correspondingly, the transverse, axial, lateral, longitudinal, radial, and the like orientations shall mean positions relative to the orientation of the wellbore or tool.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "communicatively coupled" is defined as connected, either directly or indirectly through intervening components, and the connections are not necessarily limited to physical connections, but are connections that accommodate the transfer of data between the so-described components. A "processor" as used herein is an electronic circuit that can make determinations based upon inputs. A processor can include a microprocessor, a microcontroller, and a central processing unit, among others. While a single processor can be used, the present disclosure can be implemented over a plurality of processors.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

The term "radial" and/or "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object. The term "formation" means the below ground level, geological structure in which hydrocarbons are located. The term "reservoir" refers to the pool of hydrocarbons within the formation. The term "overpressure condition" means pressure in excess of the maximum allowable pressure (rated working pressure) for a given component."

Disclosed herein is a pressure relief valve having a projection extendible to apply a lateral force to a buckling rod of an internal sealing mechanism, thereby actuating and releasing pressure from a piping system to which the pressure relieve valve can be coupled.

During oil and gas operations, pumping operations are often required in order to inject various fluids into a wellbore. The types of fluid depend on the particular needs or phase of the operation. For example, when installing a casing in a wellbore, cement is required to be pumped downhole between the casing and wall of the wellbore. Further, in fracturing operations, fluid containing gelling agents or proppant is pumped within the formation. Additionally, in post fracturing operations such as reservoir flooding, pumping of fluid downhole is conducted. There may be numerous operations requiring pumps and pressurized systems.

A surface work string is provided above ground on the surface, which includes pumping equipment, conveyances such as piping, tubing, lines, joints, or other components where various fluids and additives can be mixed and pumped into a downhole work string. During such pumping operations an overpressure condition can result in the surface work string. For example if there is a blockage downhole, this can result in sudden spikes of pressure throughout the system. Such increases in pressure, whether sudden or built up over time, can result in safety hazards. For example, the surface work string including the pumping equipment can have a maximum safe pressure level above which failure can occur.

The pressures which can cause such failure can depend on the equipment used, as well as the operation and pumping equipment. Accordingly, the pressure at which failure occurs or risk of failure may vary. Therefore, disclosed herein is a pressure relief valve which can be adjusted to accommodate different overpressure conditions and provide pressure release at varying predetermined pressures.

The pressure relief valve disclosed herein includes a housing having an inlet and a relief outlet connected by a passageway for a fluid. The housing also has a sealing mechanism including a head and a buckling rod which axially supports the head. The head is sealingly disposed between the inlet and outlet of the safety valve thus closing the fluid passageway. Accordingly, as fluid flows past the relief valve in the work string, fluid may enter a portion of the relief valve inlet and contact the head but be prevented from exiting the relief outlet, and thus continue on in the work string.

The buckling rod is configured to "buckle" or collapse at a particular predetermined pressure (i.e., load) imposed by fluid against the head. Ordinarily, the buckling rod is straight, withstanding the axial load imposed on the head and keeping it in place. However, as the pressure of the fluid increases against the head, the compressive load on the buckling rod increases. At some point the load rises to a critical level and the buckling rod bends, or bows, thus deforming. As a result of bending, the buckling rod can no longer support the axial load imposed on the head and the buckling rod then buckles, resulting in collapse. Upon buckling, the head then slides past the safety outlet thus opening the passage between the inlet and outlet. Accordingly, fluid can flow through the relief outlet and release pressure in the system. The load at which the buckling rod ceases to be able to bear a load and buckles and collapses can be referred to as the "buckling load" of the buckling rod.

The buckling rod can be configured to buckle and collapse at any particular predetermined load, (e.g. pressure or force) imposed in the axial direction. The buckling load depends on many features: material, length, diameter or cross section size, end configuration, and manufacturing tolerances of the buckling rod. However, with all features except length held constant, the buckling load varies in relation to its length.

The buckling rod therefore is under axial load as result of pressure on the head by fluid in a surface work string. As noted, when the load becomes sufficiently great, the rod buckles, which then results in axial movement of the head under the pressure of the fluid. The buckling of the rod however can be actuated by applying a lateral force against the buckling rod transverse to its axis. This has the effect of bending, or bowing, the buckling rod. The bowing adds eccentricity to the already loaded buckling rod. This causes immediate additional compressive stress as well as an immediate decrease in the load carrying capacity of the buckling rod. When this occurs, the buckling rod then "buckles" and collapses, thereby opening the passageway to relieve pressure in the system to which it is connected at the inlet. Accordingly, the pressure relief valve can be actuated to release pressure at will or predetermined detected pressure by extending a projection to impose lateral force on the buckling rod.

Pumping System

The pressure relief valve disclosed herein can be used with any pressurized system in order to provide safety pressure release. The pressure relief valve can be employed in connection with a work string on the surface related to an oil and gas operation. The pressure relief valve can be used in conjunction with any fluid transfer system susceptible to overpressure events, for example, this can be used in a boiler system, a compressor station, and other situations where pressure relief is potentially required. The pressure relief valve can be employed in a pumping system connected with a work string extending from the surface into a drilled borehole. The pumping system on the surface can be connected to discharge equipment and related components, also referred to as discharge manifold equipment (also in the field referred to informally as "iron"), for discharging fluid into a conveyance. The discharge manifold equipment affects the discharge of pressurized fluid from the one or more pumps.

In some oil and gas operations there can be containers or trucks, some containing a fluid such as water or salt water as well as others having additives, such as sand, other proppant or chemical additives. The fluid can be composed of liquids, gases, slurries, foams, multiphase or other phases. For example the fluid can include a fracturing fluid, a cement, a drilling mud, nitrogen, completion brine, acid, displacement fluid, steam water, treated water, hydrocarbons, $CO_2$, or other fluid. The water and additives can be provided to a blender which mixes the water and additives together and then provided to one or more pumps. The pumps pressurize the fluid into a distribution manifold, which then discharges the pressurized fluid into a discharge line, and further into a conveyance which passes to the downhole work string. For ease of reference, the system together, including the pumps, discharge equipment, and subsequent conveyances can be referred to as the surface work string.

The pressure relief valve can be connected anywhere along the surface work string subsequent a pump. However, the pressure relief valve may be positioned closer to the pumps, for example in the discharge line or discharge manifold or a line exiting the pump.

As described, the pressure relief valve can be employed with any pressurized system. For example, the pressure relief valve disclosed herein can be provided in relation to fracturing operations. In such operations pressures can reach several thousands of psi, and thus safety can become a concern. Pressure can range from 600 to 20,000 psi, with pressure spikes reaching much higher than the operating range. Accordingly, the potential for equipment or systemic failure is possible. Although not restricted to such operations, one example of a pressurized system is an exemplary fracturing system 10 illustrated in FIG. 1.

In certain instances, the system 10 includes a fracturing fluid producing apparatus 20, a fluid source 30, a proppant source 40, a blender 45, a pump system 50, surface work string 55, and pressure relief valve 200 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. Proppant can include sand or other hard particulate matter. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The fracturing fluid is then passed to a blender 45 to be combined with other components, including proppant from the proppant source 40 and/or additional fluid from the additives 70 and then received by pump system 50. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping system 50. Such metering devices may permit the pumping system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, along with proppant at other times, and combinations of fluid and various components at other times.

As shown in FIG. 1, the pressure relief valve 200 can be connected to the surface work string 55, which includes pump system 50 and conveyances or lines exiting from the pump system 50. The pressure relief valve 200 may be connected to the system at or subsequent the pump 50. The pressure relief valve 200 can also be connected to the system prior to being passed down the well 60. The work string includes conveyances such as tubular members, piping, coiled tubing, jointed pipe, and/or other structures that allow fluid to flow into the well 60.

Figure 1A:
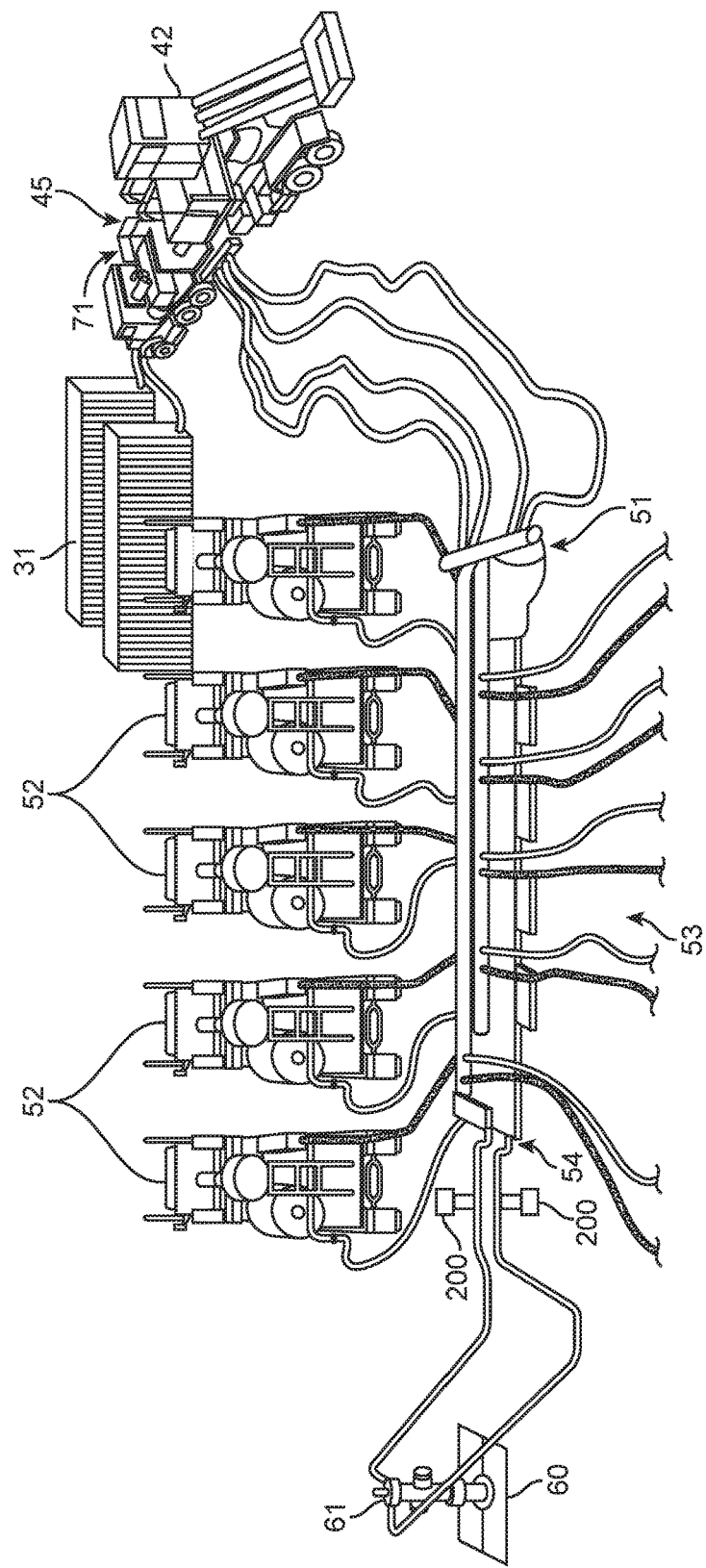
FIG. 1A is a diagram illustrating an exemplary environment for a pumping system that employs a pressure relief valve in accordance with the present disclosure.

An environmental perspective of a pumping system is shown in FIG. 1A. As shown, a fluid source 31 (such as water or salt water) may be provided to an additive unit 71, which can add gelling agents to the fluid from fluid source 31. This can then be sent to a blender 45 which can blend the fluid with proppant from a proppant source 42. The proppant source can be for example sand or hard particulate matter. The blended fluid can then be provided to distribution manifold equipment 53 on a low pressure side 51. A series of pumps 52 can be provided on trucks which pressurize the system and pump the fluid from the high pressure side 54 of the distribution manifold 53 to the wellhead 61, and into the well 60. For purposes of this disclosure, the conveyances and lines from the pumps 52 to the distribution manifold 53 and to the wellhead can be referred to as a surface work string. The pressure relief valve 200 disclosed herein can be provided anywhere along the surface work string to provide pressure relief thereto.

Figure 2:
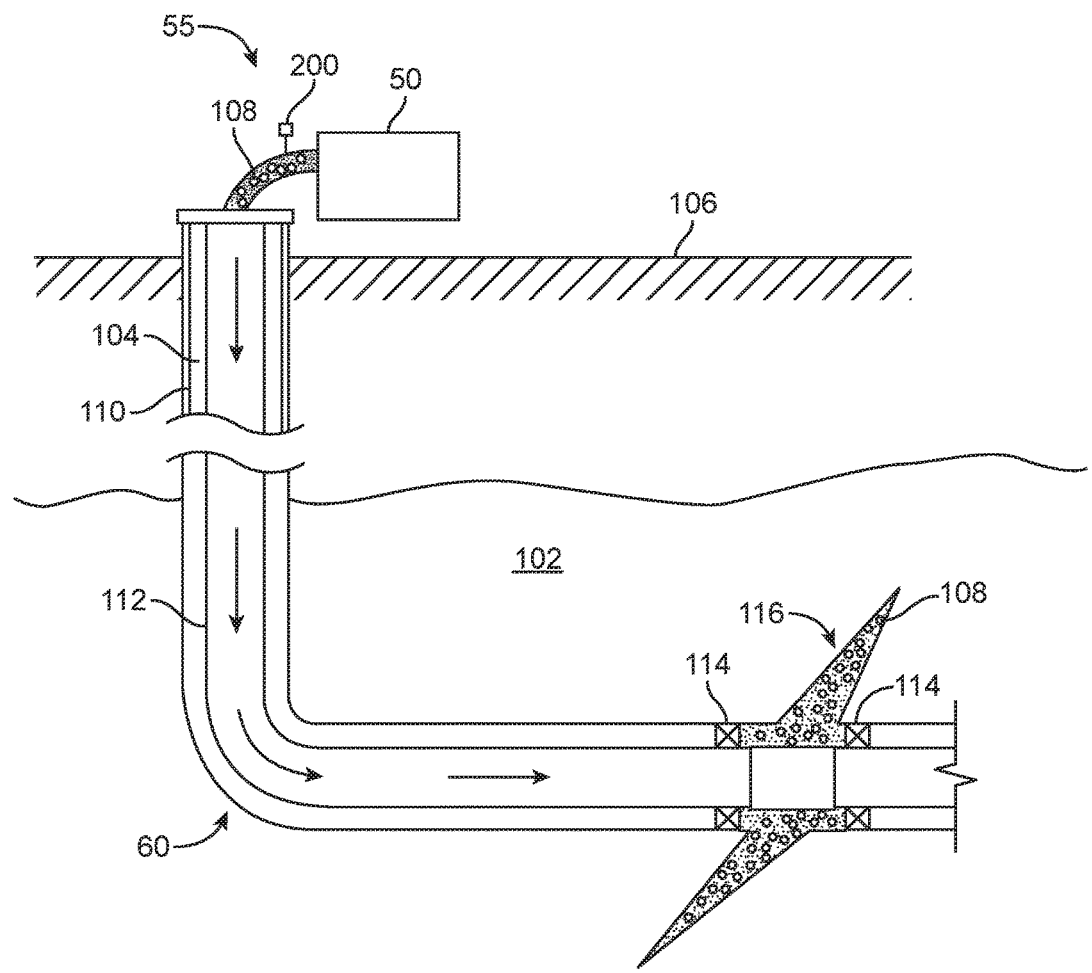
FIG. 2 is a diagram illustrating a fracturing system employing a pressure relief valve in accordance with the present disclosure.

FIG. 2 shows the well 60 during a fracturing operation as shown in FIG. 1 in a portion of a subterranean formation of interest 102 (usually having a hydrocarbon reservoir) surrounding a well bore 104. The well bore 104 extends from the surface 106, and the fracturing fluid in work string 55 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110, any cement, and into the formation to allow fracturing fluids 108 and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump system 50 is coupled to surface work string 55, for pumping the fracturing fluid 108 into well bore 104 via downhole work string 112. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and wall of the well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

Although a fracturing system is discussed above, the pressure relief valve 200 can be used in other operations that involved a pressurized work string or system. For example, as noted in FIG. 2, there is a casing 110 that may be cemented or otherwise secured to the well bore 104. The pump 50 can pump cement mixture mixed in blender 45, and then pumped via surface work string 55 into the annulus between the well bore 104 and the casing 110. The pressure relief valve 200 can be connected to the surface work string 55 and pump system 50 for providing a safety pressure release. The pressure relief valve 200 can be used in other pressurized applications other than fracturing systems or cement operations as well.

Actuable Pressure Relief Valve

Figure 3:
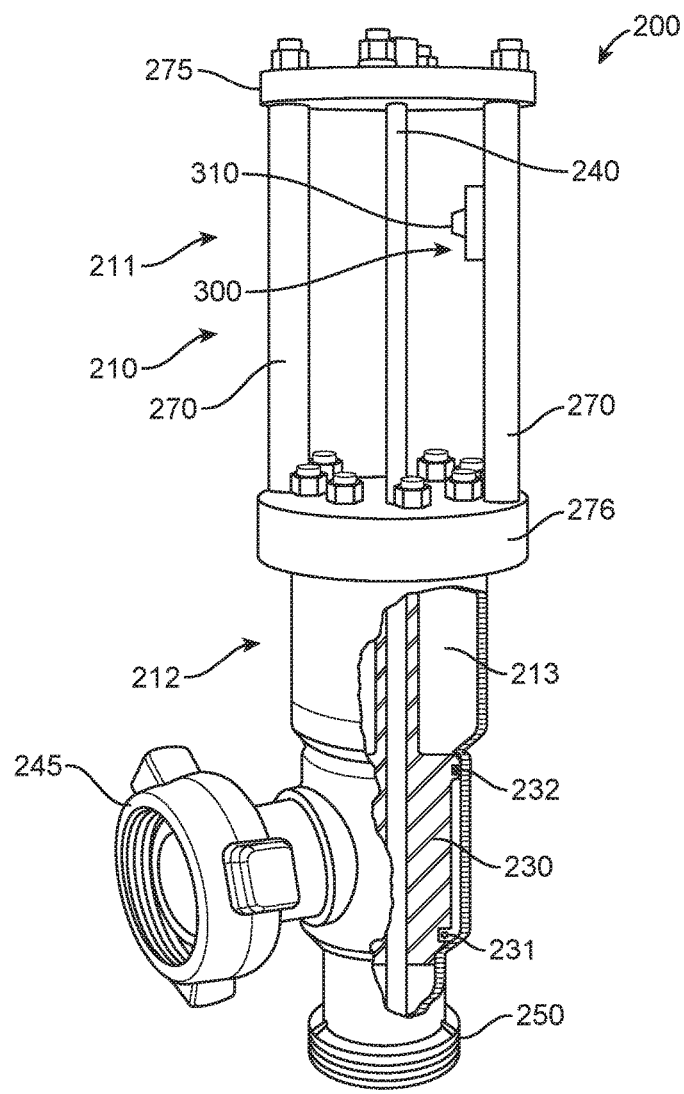
FIG. 3 is a diagram illustrating a pressure relief valve having a projection for applying a lateral force to a buckling rod in accordance with the present disclosure.

The exemplary pressure relief valve 200 is illustrated in FIG. 3. As shown the relief valve 200 has a housing 210 with lower housing 211 and upper housing 212. The upper housing 212 has an inlet 245, a relief outlet 250 and an interior space 213 (see FIG. 5). The inlet 245 is couplable to a surface work string and can receive fluid flow therein. The fluid can be any type of fluid flowing through the work string. For example, it can include fracturing fluid as discussed above, cement, water, salt water, or any other fluid. The internal contents of the upper housing 212 include a fluid flow passageway which connects the inlet 245 and outlet 250, as well a head sealingly disposed in the passageway, as further described below.

The lower housing 211 comprises a portion of an elongate buckling rod 240. The lower housing 211 can be made up of an open housing support, such as two or more support rods 270 on opposing lateral sides or surrounding the outer peripheral circumference. Alternatively, or additionally, the lower housing 211 may include a closed housing (with or without suitably sized access windows) where the internal contents are enclosed by a walled structure. The buckling rod 240 extends from within the upper housing 212 from its proximal end through upper frame 276 to the base frame 275 at the buckling rod 240's distal end.

The support rods 270 extend from the upper frame 276 to the base frame 275. The support rods 270 provide mechanical strength for supporting the buckling rod 240 and maintaining the structure of the lower housing 211. For example, when fluid pressure is imposed at the inlet 245, the force of the pressure transfers through the buckling rod 240 against the base 275. Accordingly, with increased pressure at the inlet 245, the buckling rod 240 is forced axially against the base 275. With increased pressure the buckling rod is forced to carry a greater load and resulting force along its length. As discussed above, at some point the force or load imposed on the buckling rod 240 is so great that it begins to deform (bend, or bow) and then "buckles" or collapses, referred to herein as the buckling load. The occurrence is analogous to a column provided in a building between floors. The columns, like the buckling rod 240, are under concentric axial load. If the load imposed on the column by the upper floors becomes great enough, the column begins to deform, eventually buckling and collapsing.

The buckling load of a buckling rod 240 can depend on a number of factors, including material, length, and diameter of the rod. Generally, the buckling rod is made up of solid steel or other metal. Conceivably, other materials could be employed such as a hard plastic or composite if sufficient strength and rigidity is provided. Further, with increased diameter the buckling load of the buckling rod 240 increases. With the type of materials and diameter held constant, the buckling load of the buckling rod 240 is related to its length.

While not held to any particular principle, the excess pressure, or axial force, that the buckling rod can accommodate may be determined by the Euler equation, namely formula (1) below:

$$F = \frac{\pi^2 EI}{(KL)^2} \quad (1)$$

Wherein F is the maximum or critical force (buckling load), E is modulus of elasticity, I is F moment of inertia, L is unsupported length of column, and K is column effective length factor. Therefore, the buckling load is inversely proportional to the square of the length of the buckling rod.

Figure 5:
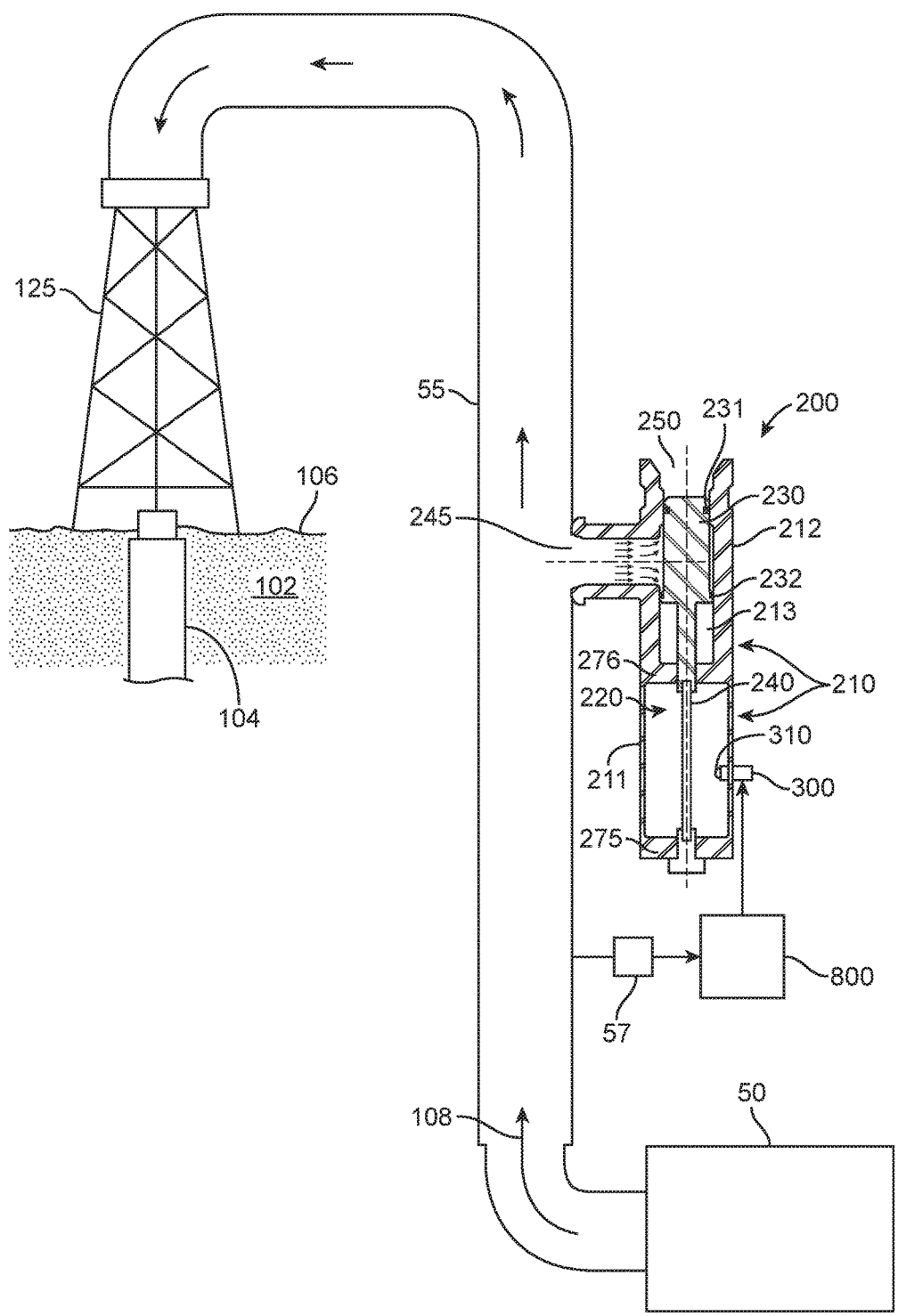
FIG. 5 is a diagram illustrating a pressure relief valve coupled to a pressurized system in accordance with the present disclosure.
Figure 6:
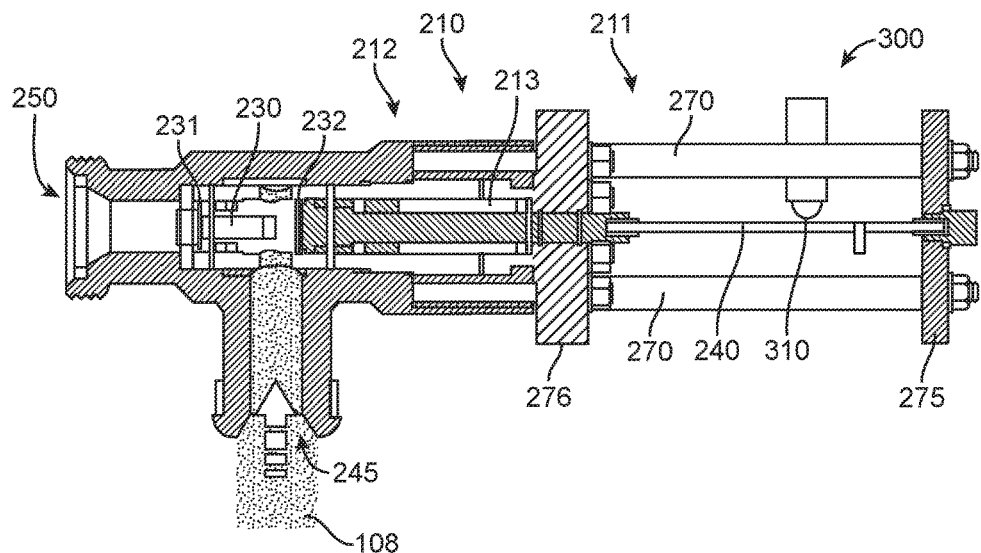
FIG. 6 is a diagram illustrating a pressure relief valve with a projection in a retracted configuration in accordance with the present disclosure.

As further illustrated in FIG. 3, the pressure relief valve 200 can have an extending device 300 for extending the projection 310 laterally against the buckling rod 240 (further shown in FIGS. 5-6). The extending device can be coupled to the lower housing 211, and in particular one or more of the support rods 270. The projection 310 in the illustrated embodiment is shown in a retracted configuration. In this configuration the projection 310 is retracted away from and not in contact with the buckling rod 240. The projection 310 can be extended to engage and apply a lateral force transverse, or perpendicular, to the axis of the buckling rod 240. The lateral force causes the buckling rod 240 to bend, or bow, from its axial center thus causing the load to be applied eccentrically. The buckling rod 240 will then buckle or collapse under the existing load being applied by the pressure of fluid at the inlet 245 thereby opening the passage and releasing fluid from relief outlet 250.

Figure 4:
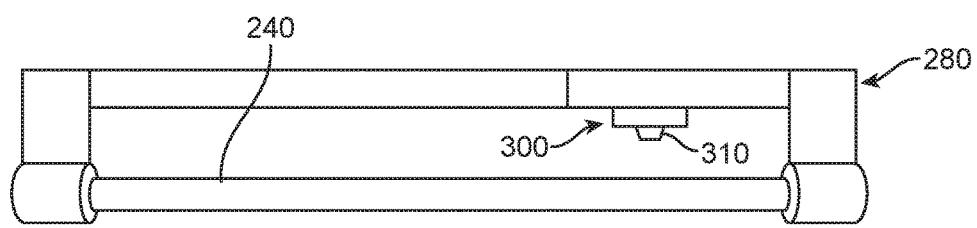
FIG. 4 is a diagram illustrating a buckling rod for a pressure relief valve in accordance with the present disclosure.

FIG. 4 illustrates another example wherein the extending device 300 is coupled to a support 280. The support 280 is coupled to a buckling rod 240. Accordingly, rather than being attached to a housing of the pressure relief valve 200, the extending device 300 and projection 310 can be coupled to the buckling rod 240.

Referring now to FIG. 5, a pressure relief valve 200 is coupled to a surface work string 55 having fracturing fluid 108. The fracturing fluid 108 is pumped by pumping system 50 to a rig or wellhead 125 and into the downhole work string 112. A pressure detector 57, such as a transducer, can be coupled to the surface work string 55 to detect the pressure of fracturing fluid 108. The relief valve 200 is shown having inlet 245 and relief outlet 250. As shown the relief valve has a sealing mechanism 220 within its housing 210. The sealing mechanism 220 has a head 230 and buckling rod 240. The head 230 is sealingly disposed within the passageway between the inlet 245 and the relief outlet 250 thus closing the passageway to fluid flow. The head 230 can for example include a number of seals 231 and 232 which prevents the flow of fluid to the relief outlet 250 and into the interior space 213 of upper housing 212. Further shown by the arrows, fracturing fluid 108 is under pressure and imposes force against the head 230 due to seals 232 being of larger area exposed to fluid flow 108 than the exposed area of seals 231, thus placing axial force on the buckling rod 240. The extending device 300 for extending the projection 310 against the buckling rod 240 is shown coupled to the housing 210.

Figure 7:
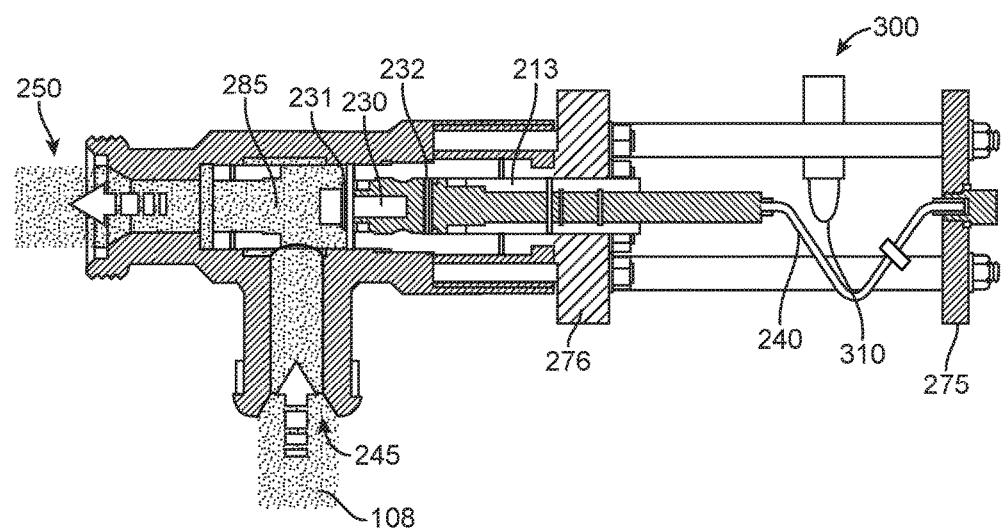
FIG. 7 is a diagram illustrating a pressure relief valve with a projection in an extended configuration and a buckling rod in a buckled configuration in accordance with the present disclosure.

The action of the buckling rod 240 and the extension of projection 310 is illustrated in FIGS. 6-7. FIGS. 6 and 7 illustrate the projection 310 in a retracted configuration and an extended configuration respectively. In each of FIGS. 6 and 7, fracturing fluid is entering inlet 245. However, in FIG. 6 where the buckling rod 240 is straight, the head 230 having seals 231 is blocking the passageway to relief outlet 250. The buckling rod 240 can be selected such that its resistance to buckling exceeds any potential column load created by the pressure of the fluid at inlet 245, or just above an overpressure condition, or just above a particular predetermined relief pressure. An overpressure condition is where pressure spikes or rises to a potentially dangerous range where failure of equipment might occur. Selecting the buckling rod for above the overpressure condition or relieving pressure ensures that there is no premature buckling of the buckling rod 240.

When a predetermined pressure is reached, detected for example by pressure detector 57 (see FIG. 5), the projection 310 can be extended to an extended configuration, shown for example in FIG. 7. Alternatively, the projection 310 can be extended at any time by an operator by actuating the extending device 300. In any case, the projection 310 can be extended to apply a lateral force on the side of the buckling rod 240, thereby deforming the buckling rod 240. The buckling rod 240 is then deformed from straight to bowed, thereby decreasing its load carrying capability, and decreasing its buckling load. Accordingly the increase in stress and decrease in load carrying capability of buckling rod 240 causes buckling as shown in FIG. 7.

Upon buckling of the buckling rod 240, the head 230 then slides from relief outlet 250 thereby opening the passageway 285. With opening of the passageway 285, fluid can then exit the relief outlet 250 thus release fluid and relieving pressure of the system.

The manner in which projection 310 is extended is not particularity restricted. For example, extending device 300 may include an electromechanical device, for example a solenoid plunger. In such examples, the electromechanical device when actuated can produce an electromagnetic field which extends projection 310 laterally against the buckling rod 240. The electromechanical device can be actuated for example by a push button on the outside of the housing 211. Or alternatively, the electromechanical device can be communicatively coupled to pressure detector 57 (see FIG. 5), which upon reaching a predetermined pressure actuates the electromechanical device to extend projection 310.

A pressure monitoring system controller 800 (see FIG. 5), having a processor, a storage device, and software coding instructions, can be implemented to monitor the pressure of the surface work string 55 and actuate the electromechanical device (the extending device 300) when a predetermined pressure is reached. Further, one or more pressure detectors 57 and pressure relief valves 200 each having an electromechanical extending device 300 can be employed on various portions of the surface work string 55 or different work strings, and communicatively linked to the pressure monitoring system 800. This would enable simultaneous operation of all safety valves from a central pressure monitoring system controller 800. Accordingly, pressure could be monitored across work strings, and further, the communicatively coupled pressure relief valves may be actuated by extending a projection 310 in each of the connected pressure relief valves. By such system, two or more pressure relief valves 200 could be actuated at exactly the same time and predetermined pressure setting, thus enabling coordination of multiple pressure relief valves 200.

In addition to electromechanical, extending devices 300 can also be actuated by hydraulic or pressurized fluid (liquid, gas or both). For example, pneumatic, or hydraulic cylinders may be configured to apply force to extend projection 310. Moreover, the extending device 300 can be actuated manually directly or indirectly through linkages. For example, a lever can be attached to the external portion of housing 211, and upon lifting or pushing a lever, the projection 310 can be extended.

Figure 8:
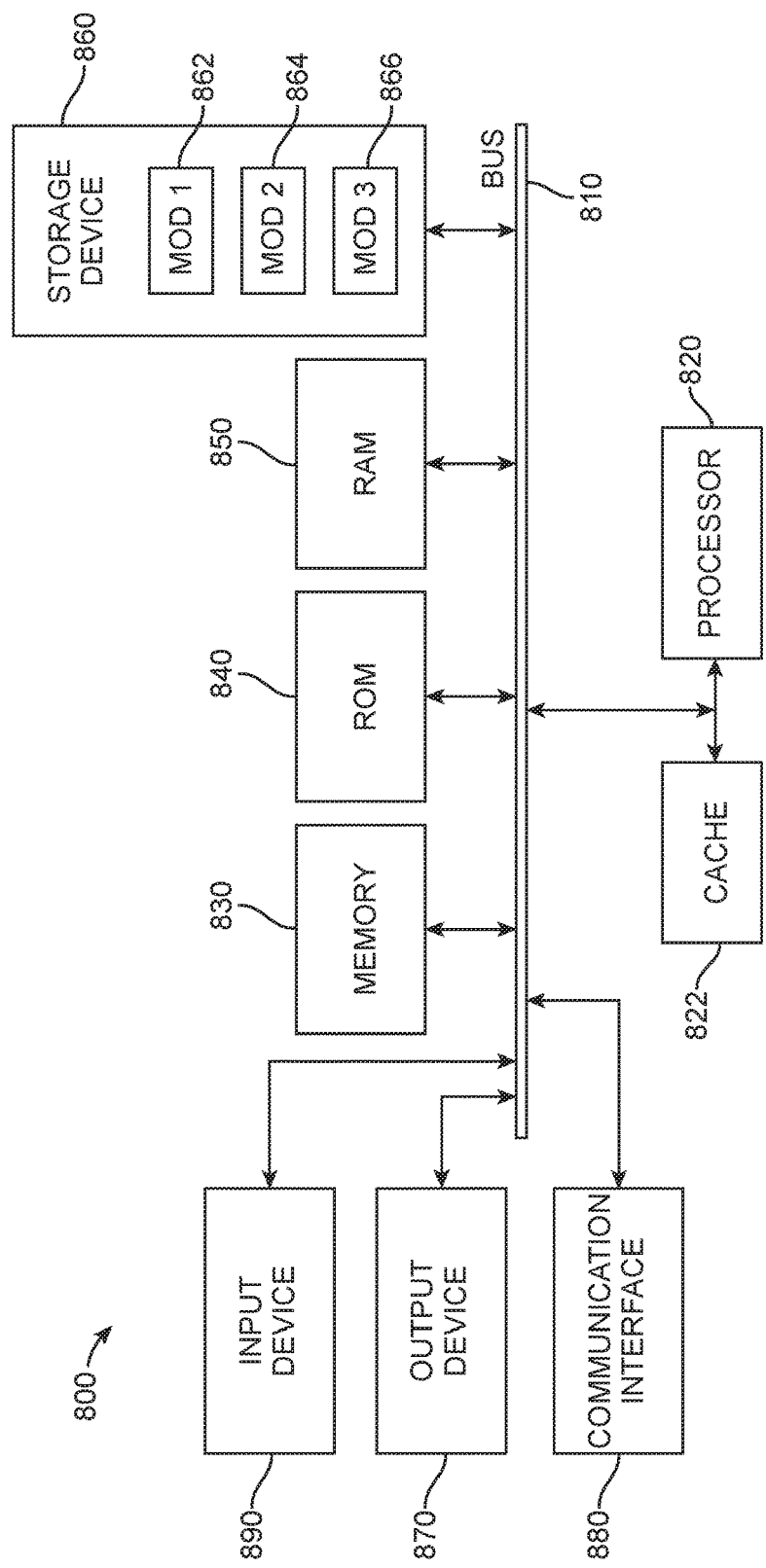
FIG. 8 is a schematic of an exemplary controller for having a processor suitable for use in the methods and systems disclosed herein.

With reference to FIG. 8, an exemplary system and/or pressure monitoring system controller 800 includes a processing unit (for example, a central processing unit (CPU) or processor) 820 and a system bus 810 that couples various system components, including the system memory 830, read only memory (ROM) 840 and random access memory (RAM) 850, to the processor 820. The system controller 800 can include a cache 822 of high-speed memory connected directly with, in close proximity to, or integrated as part of the processor 820. The system controller 800 can copy data from the memory 830 and/or the storage device 860 to the cache 822 for access by the processor 820. These and other modules can control or be configured to control the processor 820 to perform various operations or actions. The memory 830 can include multiple different types of memory with different performance characteristics.

Multiple processors or processor cores can share resources such as memory 830 or the cache 822, or can operate using independent resources. The processor 820 can include one or more of a state machine, an application specific integrated circuit (ASIC), or a programmable gate array (PGA) including a field PGA. The system bus 810 can be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the system controller 800, such as during start-up.

The system controller 800 can further include storage devices 260 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 860 can include software modules 862, 864, 866 for controlling the processor 820. The system controller 800 can include other hardware or software modules. Although the exemplary embodiment(s) described herein employs a hard disk as storage device 860, other types of computer-readable storage devices which can store data that are accessible by a computer, such as magnetic cassettes, flash memory cards, digital versatile disks (DVDs), cartridges, random access memories (RAMs) 850, read only memory (ROM) 840, a cable containing a bit stream and the like may also be used in the exemplary operating environment. Tangible computer-readable storage media, computer-readable storage devices, or computer-readable memory devices, expressly exclude media such as transitory waves, energy, carrier signals, electromagnetic waves, and signals per se.

The basic components and appropriate variations can be modified depending on the type of device, such as whether the system controller 800 is a small, handheld computing device, a desktop computer, or a computer server. When the processor 820 executes instructions to perform "operations", the processor 820 can perform the operations directly and/or facilitate, direct, or cooperate with another device or component to perform the operations.

To enable user interaction with the system controller 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the system controller 800. The communications interface 880 generally governs and manages the user input and system output. There is no restriction on operating on any particular hardware arrangement and therefore the basic hardware depicted may easily be substituted for improved hardware or firmware arrangements as they are developed.

One or more parts of the example system controller 800, up to and including the entire system controller 800, can be virtualized. For example, a virtual processor can be a software object that executes according to a particular instruction set, even when a physical processor of the same type as the virtual processor is unavailable.

Numerous examples are provided herein to enhance understanding of the present disclosure. A specific set of examples are provided as follows. In a first example, a pressure relief valve is disclosed including a housing having an inlet and a relief outlet connected by a fluid flow passageway, the inlet fluidly connectable to a work string; a head sealingly disposed within the passageway between the inlet and relief outlet closing the fluid flow passageway between the inlet and relief outlet; an elongate buckling rod supporting the head and bucklable at a predetermined load thereby permitting sliding of the head from between the inlet and the relief outlet and opening the fluid flow passageway; and a projection within the housing extendible to an extended configuration, wherein in the extended configuration the projection applies a lateral force transverse to a longitudinal direction of the buckling rod bending the rod thereby decreasing the load at which the buckling rod collapses.

In a second example, a pressure relief valve according to the first example is disclosed, wherein the projection further has a retracted configuration, wherein in the retracted configuration the projection does not apply a lateral force to the buckling rod.

In a third example, a pressure relief valve according to the first or second examples is disclosed, wherein the projection is extended by an electric extending device or fluid extending device.

In a fourth example, a pressure relief valve is disclosed according to any of the preceding examples first to the third, wherein the projection is manually extendible.

In a fifth example, a pressure relief valve is disclosed according to any of the preceding examples first to the fourth, wherein the projection is coupled to and extendible from the housing.

In a sixth example, a pressure relief valve is disclosed according to any of the preceding examples first to the fifth, wherein the projection is communicatively coupled to a pressure detector.

In a seventh example, a pressure relief valve is disclosed according to any of the preceding examples first to the sixth, wherein the projection is extended upon detection of a predetermined detected pressure.

In an eighth example, a pressure relief valve is disclosed according to any of the preceding examples first to the seventh, wherein the projection is coupled to a portion of a support coupled to the buckling rod.

In a ninth example, a work string is disclosed, including a tubular conveyance having a pump and a pressure relief valve; the pressure relief valve having a housing having an inlet and a relief outlet connected by a fluid flow passageway, the inlet fluidly connected to the tubular conveyance; a head sealingly disposed within the passageway between the inlet and relief outlet closing the fluid flow passageway between the inlet and relief outlet; an elongate buckling rod supporting the head and bucklable at a predetermined load thereby permitting sliding of the head from between the inlet and the relief outlet and opening the fluid flow passageway; and a projection within the housing extendible to an extended configuration, wherein in the extended configuration the projection applies a lateral force transverse to a longitudinal direction of the buckling rod bending the rod thereby decreasing load at which the buckling rod collapses.

In a tenth example, a work string is disclosed according to the ninth example, wherein the tubular conveyance includes a fracturing fluid.

In an eleventh example, a work string is disclosed according to the ninth or tenth examples, wherein the tubular conveyance includes cement for a borehole casing.

In a twelfth example, a work string is disclosed is disclosed according to any of the preceding examples ninth to the eleventh, wherein the projection is extended by an electric or hydraulic device.

In a thirteenth example, a work string is disclosed is disclosed according to any of the preceding examples ninth to the twelfth, further including a pressure detector coupled to the work string for detecting a pressure of a fluid within the work string.

In a fourteenth example, a work string is disclosed according to any of the preceding examples ninth to the thirteenth, wherein the electric or hydraulic extending device extends the projection to the extended configuration upon detection of a predetermined pressure by the pressure detector.

In a fifteenth example, a work string is disclosed is disclosed according to any of the preceding examples ninth to the fourteenth, wherein the projection further has a retracted configuration, wherein in the retracted configuration the projection does not apply a lateral force to the buckling rod.

In a sixteenth example, a work string is disclosed according to any of the preceding examples ninth to the fifteenth, wherein the projection is manually extendible.

In a seventeenth example, a work string is disclosed according to any of the preceding examples ninth to the sixteenth, wherein the projection is coupled to and extendible from the housing.

In an eighteenth example, a work string is disclosed is disclosed according to any of the preceding examples ninth to the seventeenth, wherein the projection is coupled to a portion of a support coupled to the buckling rod.

In a nineteenth example a system is disclosed, including a tubular conveyance having a pump and a plurality of pressure relief valves; a controller communicatively coupled to the plurality of pressure relief valves; and the plurality of pressure relief valves each having a housing having an inlet and a relief outlet connected by a fluid flow passageway, the inlet fluidly connected to the tubular conveyance, a head sealingly disposed within the passageway between the inlet and relief outlet closing the fluid flow passageway between the inlet and relief outlet, an elongate buckling rod supporting the head and bucklable at a predetermined load thereby permitting sliding of the head from between the inlet and the relief outlet and opening the fluid flow passageway, a projection within the housing extendible to an extended configuration, wherein in the extended configuration the projection applies a lateral force transverse to a longitudinal direction of the buckling rod bending the rod thereby decreasing the load at which the buckling rod collapses, and wherein the controller is configured to extend the projection to the extended configuration.

In a twentieth example, a system according to the nineteenth is disclosed, further including one or more pressure detectors coupled to the work string for detecting a pressure of a fluid within the work string, and wherein the controller is configured to extend the projections of each of the plurality of relief valves upon detection of a predetermined pressure by the one or more pressure detectors.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A pressure relief valve comprising:
 a housing having an inlet and a relief outlet connected by a fluid flow passageway, the inlet fluidly connectable to a work string;
 a head sealingly disposed within the passageway between the inlet and relief outlet closing the fluid flow passageway between the inlet and relief outlet;
 an elongate buckling rod supporting the head and buckable at a predetermined load thereby permitting sliding of the head from between the inlet and the relief outlet and opening the fluid flow passageway; and
 a projection coupled to and extendible from the housing to an extended configuration, wherein when in the extended configuration the projection applies a lateral force transverse to a longitudinal direction of the buckling rod bending the buckling rod thereby decreasing the load at which the buckling rod collapses.

2. The pressure relief valve of claim 1, wherein the projection further has a retracted configuration, wherein in the retracted configuration the projection does not apply a lateral force to the buckling rod.

3. The pressure relief valve of claim 1, wherein the projection is extended by an electric extending device or fluid extending device.

4. The pressure relief valve of claim 1, wherein the projection is manually extendible.

5. The pressure relief valve of claim 1, wherein the projection is communicatively coupled to a pressure detector.

6. The pressure relief valve of claim 5, wherein the projection is extended upon detection of a predetermined detected pressure.

7. The pressure relief valve of claim 1, wherein the projection is coupled to a portion of a support coupled to the buckling rod.

8. A work string comprising:
 a tubular conveyance having a pump and a pressure relief valve;
 the pressure relief valve having:
  a housing having an inlet and a relief outlet connected by a fluid flow passageway, the inlet fluidly connected to the tubular conveyance;
  a head sealingly disposed within the passageway between the inlet and relief outlet closing the fluid flow passageway between the inlet and relief outlet;
  an elongate buckling rod supporting the head and buckable at a predetermined load thereby permitting sliding of the head from between the inlet and the relief outlet and opening the fluid flow passageway; and
  a projection coupled with and extendible from the housing to an extended configuration, wherein when in the extended configuration the projection applies a lateral force transverse to a longitudinal direction of the buckling rod bending the buckling rod thereby decreasing load at which the bucking rod collapses.

9. The work string of claim 8, wherein the tubular conveyance comprises a fracturing fluid.

10. The work string of claim 8, wherein the tubular conveyance comprises cement for a borehole casing.

11. The work string of claim 8, wherein the projection is extended by an electric or hydraulic device.

12. The work string of claim 11, further comprising a pressure detector coupled to the work string for detecting a pressure of a fluid within the work string.

13. The work string of claim 12, wherein the electric or hydraulic extending device extends the projection to the extended configuration upon detection of a predetermined pressure by the pressure detector.

14. The work string of claim 8, wherein the projection further has a retracted configuration, wherein in the retracted configuration the projection does not apply a lateral force to the buckling rod.

15. The work string of claim 8, wherein the projection is manually extendible.

16. The work string of claim 8, wherein the projection is coupled to a portion of a support coupled to the buckling rod.

17. A system comprising:
 a tubular conveyance having a pump and a plurality of pressure relief valves;
 a controller communicatively coupled to the plurality of pressure relief valves; and the plurality of pressure relief valves each having:
- a housing having an inlet and a relief outlet connected by a fluid flow passageway, the inlet fluidly connected to the tubular conveyance,
- a head sealingly disposed within the passageway between the inlet and the relief outlet closing the fluid flow passageway between the inlet and relief outlet,
- an elongate buckling rod supporting the head and bucklable at a predetermined load thereby permitting sliding of the head from between the inlet and the relief outlet and opening the fluid flow passageway,
- a projection coupled with and extendible from the housing to an extended configuration, wherein when in the extended configuration the projection applies a lateral force transverse to a longitudinal direction of the buckling rod bending the buckling rod thereby decreasing the load at which the buckling rod collapses, and wherein the controller is configured to extend the projection to the extended configuration.

18. The system of claim 17, further comprising one or more pressure detectors coupled to the work string for detecting a pressure of a fluid within the work string, and wherein the controller is configured to extend the projections of each of the plurality of relief valves upon detection of a predetermined pressure by the one or more pressure detectors.

\* \* \* \* \*